United States Patent [19]

Moriya et al.

[11] 4,170,672

[45] Oct. 9, 1979

[54] PROCESS FOR COATING PAPER WITH A WATER SOLUBLE THERMOSETTING RESIN

[75] Inventors: Koichi Moriya, Shibukawa; Iwao Honda, Maebashi, both of Japan

[73] Assignee: The Japan Carlit Co., Ltd., Tokyo, Japan

[21] Appl. No.: 932,411

[22] Filed: Aug. 9, 1978

Related U.S. Application Data

[63] Continuation-in-part of Ser. No. 833,048, Sep. 14, 1977, Pat. No. 4,122,071.

[30] Foreign Application Priority Data

Sep. 17, 1976 [JP] Japan ............................. 51-110745

[51] Int. Cl.² .................. B32B 27/36; D21H 1/28; C08B 11/00; C08F 220/56
[52] U.S. Cl. .......................... 427/391; 428/514; 526/287; 526/292; 526/923; 162/168 N; 260/17.4 ST; 525/329; 525/359
[58] Field of Search .............. 526/17, 292, 923, 23, 526/55, 46, 16; 427/288, 391; 162/168 N; 260/823; 428/476, 481, 514

[56] References Cited

U.S. PATENT DOCUMENTS 3,556,932  1/1971  Coscia et al. .................... 162/166
3,678,098  7/1972  Lewis et al. ..................... 260/29.6

OTHER PUBLICATIONS

C.A. 87-119591(16), Sano et al., "Agents for Processing of Paper".
Chem. Abs. 76-115105z(20), Perronin, "Binders for Comp. for Coating or Impreg. Cellulose Mat".

*Primary Examiner*—Herbert J. Lilling
*Attorney, Agent, or Firm*—Frishauf, Holtz, Goodman & Woodward

[57] ABSTRACT

A process is disclosed for coating paper with a novel water-soluble thermosetting resin, which has the property of providing paper with a nearly constant wet and dry strength over a wide pH range; the resin can be mixed, if desired, with other water-soluble polymers such as starch, its derivatives, cellulose derivatives, polyvinylalcohol and polyacrylamide, and various pigments such as clay, calcium carbonate and titanium dioxide.

9 Claims, 2 Drawing Figures

PROCESS FOR COATING PAPER WITH A WATER SOLUBLE THERMOSETTING RESIN

This application is a continuation-in-part of copending application Ser. No. 833,048, filed Sept. 14, 1977, now U.S. Pat. No. 4,122,071.

BACKGROUND OF THE INVENTION

This invention relates to a process for coating paper with paper-strengthening resins mainly composed of water-soluble thermosetting polyvinylamide polymers, which have the property of providing paper with a nearly constant wet and dry strength in the pH range of 3 to 10, the resins can be mixed, if desired, with other water-soluble polymers and various pigments.

Various processes for coating paper with resins which impart wet and dry strength to paper are known in the art. For example, there are processes for coating paper with urea and melamine resins, respectively. However, both of these processes are effective only in acid pH ranges, and moreover, manifest another disadvantage in that formalin gas is generated either in coating operations or from the resulting coated paper product. There is also a process for coating paper with polyamide-epichlorohydrin resins. This is efficient in alkaline pH ranges, but is of little effectiveness in acid, and furthermore, even in the alkaline pH ranges the resulting coated paper does not have enough dry strength. According to the above prior art, a coated paper with enough wet and dry strength is not obtained without curing at high temperatures.

SUMMARY OF THE INVENTION

It is an object of this invention to provide a process for coating paper with water-soluble thermosetting resins which impart a nearly constant wet and dry strength to paper over a wide pH range.

Another object of the invention is to provide a process for coating paper without generation of formalin gas during coating operations or from the resulting coated paper product.

Still another object of the invention is to provide a process for coating paper by which a coated paper having enough wet and dry strength is obtained without curing at high temperatures.

Other objects and advantages of the present invention will become apparent to those skilled in the art from the following description and disclosure.

DESCRIPTION OF THE PREFERRED EMBODIMENT

Figure 1:
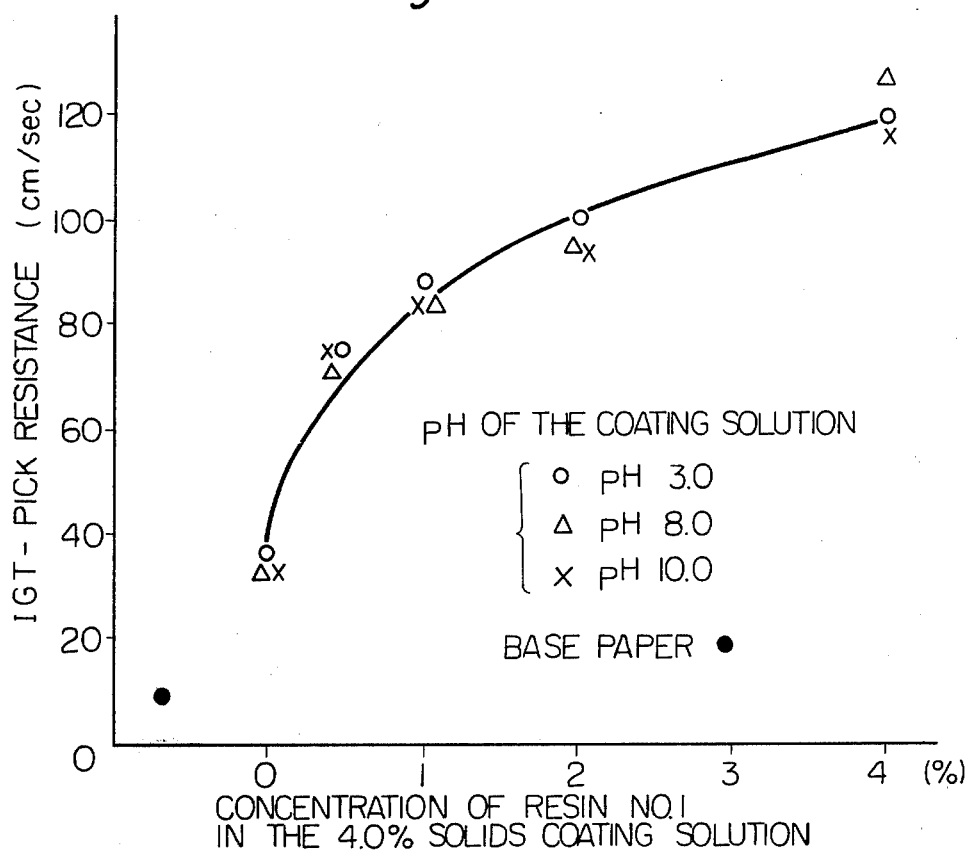
FIG. 1 shows the results of IGT-pick tests carried out on IGT printability testing of the paper coated with various concentrations of Resin No. 1 in 4.0% solids coating solutions comprising the Resin No. 1 and oxidized starch, having pH of 3.0, 8.0 and 10.0, compared with base paper.

We have now found that the above object can be obtained by the following process of coating paper with water-soluble thermosetting polyvinylamide resins having the following formula (I), which impart a nearly constant wet and dry strength to paper over a wide pH range of 3 to 10, they can be mixed, if desired, with other water-soluble polymers such as starch, its derivatives, cellulose derivatives, polyvinylalcohol and polyacrylamide, and various pigments such as clay, calcium carbonate and titanium dioxide.

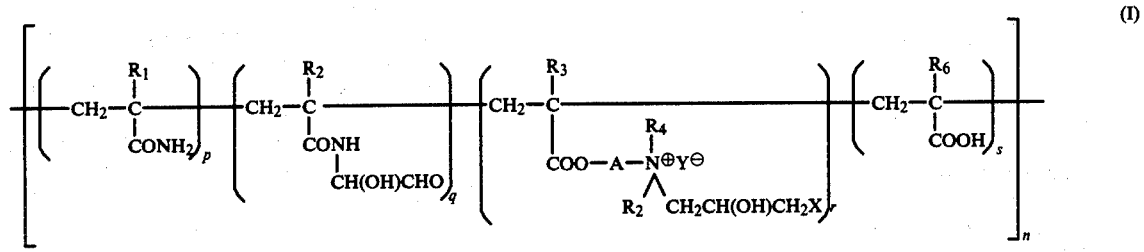

wherein:

$R_1$, $R_2$, $R_3$ and $R_6$ are independently selected from the group consisting of hydrogen and a methyl group;

both $R_4$ and $R_5$ are an alkyl group having 1 to 3 carbon atoms;

A is an alkylene group having 2 to 6 carbon atoms;

X is selected from the group consisting of chlorine, bromine and iodine;

Y is an anion selected from the group consisting of nitrate ion, chloride ion, sulfate ion and phosphate ion;

p, q, r and s are molar ratios of the recurring units arranged linearly and are the whole numbers having the relation of $q/(p+q)=0.1–1.0$, $r/(p+q+r+s)=0.001–0.1$, and $s/r=0–2.0$; and n is a number of about 100 to 1000.

The water-soluble thermosetting resins (formula I) used in this invention are prepared by polymerizing a cationic monomer (formula II), vinylamide monomers and anionic monomers, followed by the reaction of the resulting polymers (formula III) with glyoxal.

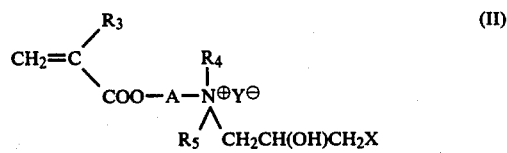

wherein $R_3$–$R_5$, A, X and Y are the same as defined in formula I.

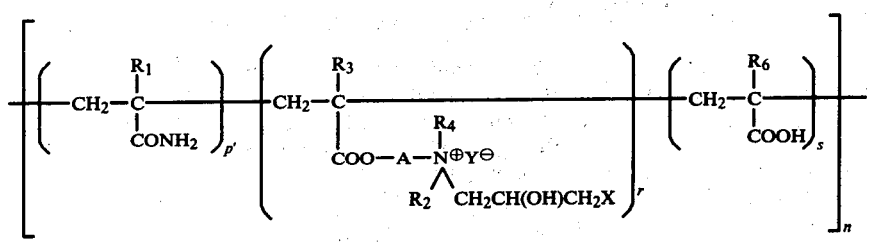

wherein $R_1$, $R_3$–$R_6$, A, X, Y and n are the same as defined in formula I, and $p'$, $r$ and $s$ are molar ratios of the recurring units arranged linearly and are the whole numbers having the relation of $r/(p'+r+s)=0.001$–$0.1$ and $s/r=0$–$2.0$.

According to the present invention, an aqueous solution having a pH 3-10 of the water-soluble thermosetting resin (I) is coated on paper so that the amount of the applied resin is brought to about 0.1 to 2.0 g/m² on dry basis, and then the resulting coated paper is air dried at room temperature or in a conventional drier, if desired. Coating of the paper can be carried out in any conventional manner which provides a substantially uniform coating on the paper, for example, by size press, calender stack, air knife, blade coaters, roll coaters or rod coaters. Coating can be made on-machine or off-machine.

If desired, the water-soluble thermosetting resin used in this invention can be used together with one or more of other types of water-soluble polymers such as starch, its derivatives (e.g. oxidized starch, cationic starch), cellulose derivatives (e.g. carboxymethyl cellulose), polyvinylalcohol and polyacrylamide, and one or more of different types of pigments such as clay, calcium carbonate and titanium dioxide. In these cases, the coating mixtures contain preferably 1 to 50 percent by weight, more preferably 3 to 30 percent by weight, of the resin based on the above other water-soluble polymers on dry basis, so as to provide a paper with enough wet and dry strength. In the case of coating the resin mixed with an anionic substance such as clay, it is preferable that the resin has an anionic recurring unit of which molar ratio to a cationic one, $s/r$, is 0.1 to 2.0, preferably 0.5 to 1.5, so as to inhibit an increase in viscosity of the coating mixtures.

The invention will be further illustrated by the following examples. Reference examples illustrate some methods of preparing the water-soluble thermosetting resin (formula I) used in this invention. All parts and percentages referred to herein are by weight unless otherwise indicated.

Reference Example 1

Into a 1-liter 4-neck flask equipped with a reflux condenser, a stirrer, a thermometer and a dropping funnel were placed 420 ml of water, 100 g of isopropanol, 99 g of acrylamide and 1 g of the recrystallized cationic monomer obtained by the reaction of 2-dimethylaminoethyl methacrylate nitrate with epichlorohydrin, and the mixed solution was adjusted to pH 3.0 with nitric acid. The solution was degassed with a nitrogen purge and heated to 50° C., and then 0.5 g of ammonium persulfate in 40 ml of water was gradually added. After the end of addition, the reaction mixture was kept at 60° C. for 2 hours for polymerization to take place. About 660 g of a 15% solids solution of the polyacrylamide polymer was obtained.

A 160 g portion of the 15% solids solution was diluted with 60 ml of water and adjusted to pH 9.5 by dropping in caustic soda while stirring. To the solution, 56 g of 10% glyoxal solution previously adjusted to pH 7.0 was added and then, the mixed solution was allowed to react at 60° C. for 2 hours. After cooling to room temperature, the resulting solution was adjusted to pH 3.0 with acid and diluted with water. Thus, ca. 300 g of a 10% solution of water-soluble thermosetting polyacrylamide resin (hereinafter referred to as Resin No. 1) having the following formula was obtained in the form of a clear, light-yellow colored solution of which the Gardner-Holdt viscosity was A.

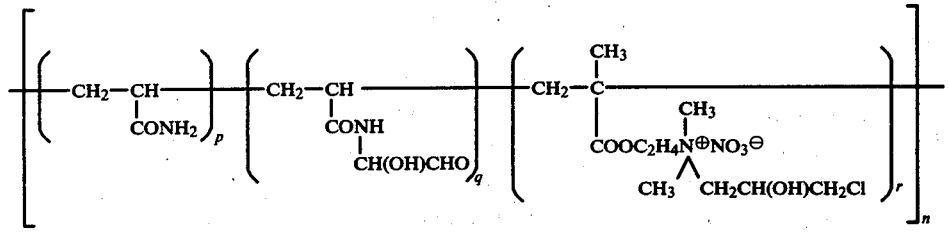

wherein $q/(p+q)=0.29$, $r/(p+q+r)=0.0023$ and n was about 700.

Reference Examples 2-5

Four different water-soluble thermosetting polyacrylamide resins (hereinafter referred to as Resins No. 2–No. 5, respectively) were prepared in the same way as described in Reference Example 1, except that the molar ratios and the type of recurring units were varied. Resins No. 2–No. 5 had Gardner-Holdt viscosity in 10% solids solution of A, A, A-B and A-B, respectively.

Resin No. 2 had the formula

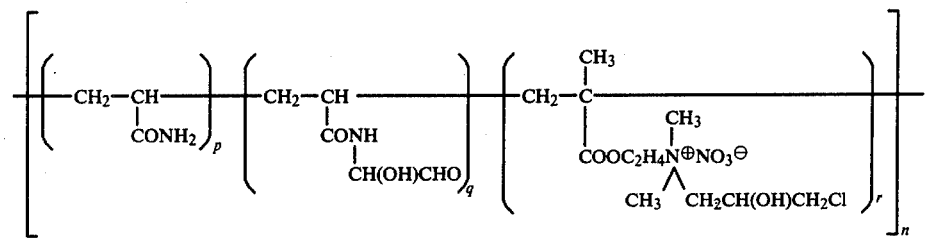

wherein $q/(p+q)=0.30$, $r/(p+q+r)=0.012$ and n was about 700.

Resin No. 3 had the formula

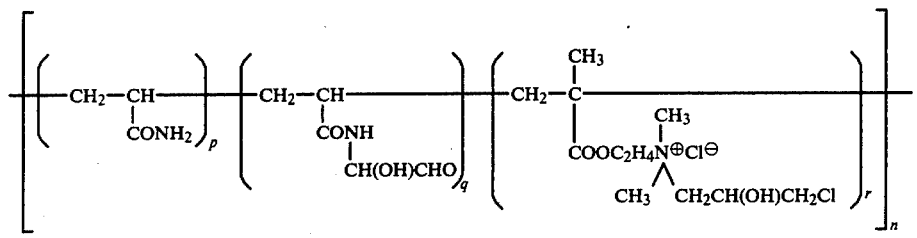

wherein $q/(p+q)=0.30$, $r/(p+q+r)=0.013$ and n was about 650.

Resin No. 4 had the formula

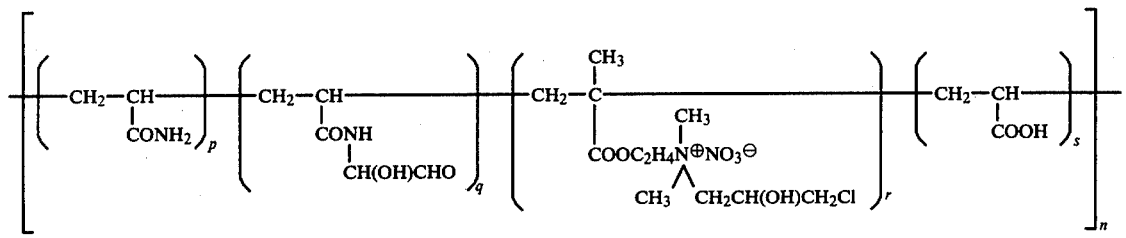

wherein $q/(p+q)=0.30$, $r/(p+q+r+s)=0.012$, $s/r=1.0$ and n was about 750.

Resin No. 5 had the formula

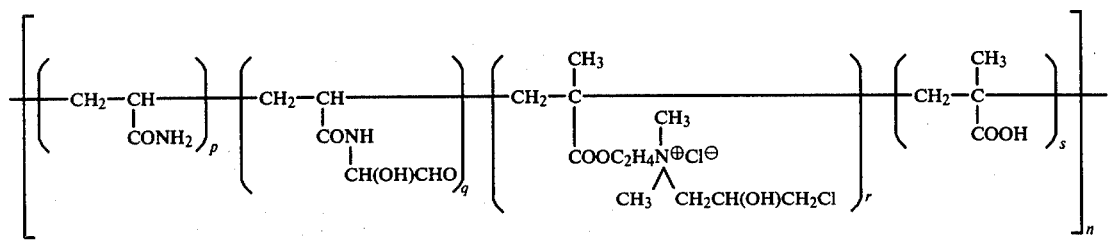

wherein $q/(p+q)=0.30$, $r/(p+q+r+s)=0.013$, $s/r=0.90$ and n was about 700.

Reference Example 6

A conventional water-soluble thermosetting polyacrylamide resin was prepared. The procedure of Reference Example 2 was repeated, except that 2-dimethylaminoethyl methacrylate was used instead of the cationic monomer of the formula II and that the tertiary amino-groups in the resulting polymer were quaternized with dimethyl sulfate. Thus, the resin (hereinafter referred to as Resin No. 6) having the following formula was obtained in a 10% solids solution having a Gardner-Holdt viscosity of A-B:

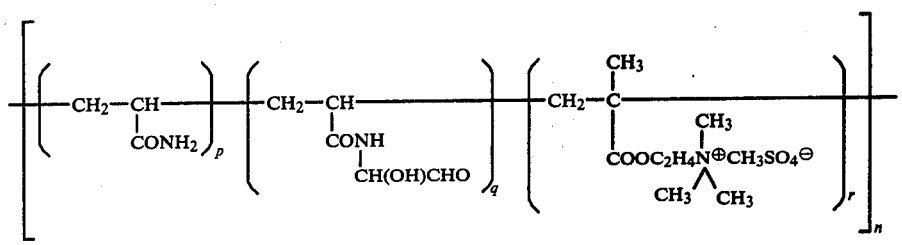

wherein $q/(p+q)=0.30$, $r/(p+q+r)=0.023$ and n was about 700.

EXAMPLE 1

Each solution of Resin No. 1, 2, 4 or 6 was diluted with water and adjusted to give a 1.0% solution having pH of 3.0, 5.0, 7.0, 9.0 or 10.0 by addition of acid or base. A sheet of No. 2 filter paper (basis weight of 120 g/m², Toyo Filter Paper Co.) was immersed in the 1% solution for one minute and pressed through press rolls and then dried at 150° C. for 2 minutes. The coating weight of resins was 1.0 g/m² for all sheets coated. After conditioning at 20° C. and 65% RH for 24 hours, wet and dry strengths of the resulting paper were measured according to JIS P 8113 and JIS P 8135. The results are given in Table 1. For all resins used, the dry breaking lengths found were substantially constant (3.8-4.0 km) within the pH range of 3 to 10, except for the control (2.5 km).

Table 1

| Resin No. | Wet Breaking Length (km) pH of 1.0% resin solution | | | | |
|---|---|---|---|---|---|
| | 3.0 | 5.0 | 7.0 | 9.0 | 10.0 |
| Control | — | — | 0.12 | — | — |
| 1 | 1.14 | 1.25 | 1.25 | 1.22 | 1.18 |
| 2 | 1.25 | 1.34 | 1.34 | 1.31 | 1.32 |
| 4 | 1.47 | 1.49 | 1.49 | 1.46 | 1.39 |
| 6 | 1.06 | 1.21 | 1.05 | 0.85 | 0.41 |

EXAMPLE 2

Figure 2:
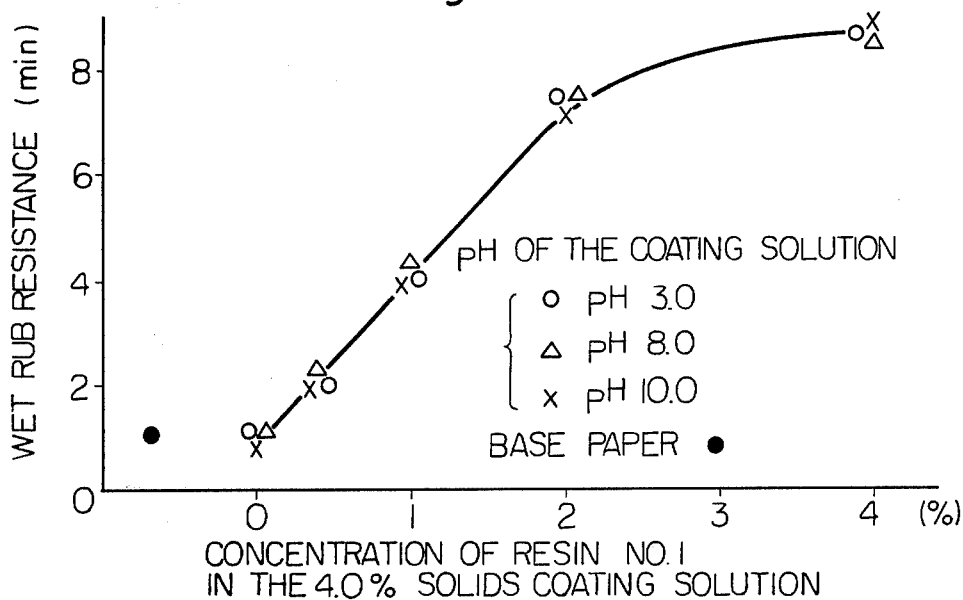
FIG. 2 shows the results of wet rub tests of the paper coated with various concentrations of Resin No. 1 in 4.0% solids coating solutions comprising the Resin No. 1 and oxidized starch, having pH of 3.0, 8.0 and 10.0, compared with base paper.

An aqueous slurry of a commercially available oxidized starch was cooked together with Resin No. 1 at about 100° C. for one hour and cooled. The mixed solution was diluted with water and adjusted to pH 3.0, 8.0 or 10.0 at 4.0% solids by addition of acid or base. With the resulting solution, a commercially available wood free paper was coated by means of a size press so as to provide a coating weight of 4.0 to 4.5 g/m². The resulting coated paper was air dried at room temperature (20°-30° C.) and then evaluated for IGT-pick resistance and wet rub resistance. The IGT-pick test was carried out on an IGT printability tester (IPI ink No. 7, spring drive A, 50 kgf load). The wet rub test consisted of rubbing the coated paper surface with a rotating grindstone roll (GC#60, 16 mmφ×19 mm; 50 rpm), the bottom end of which was soaked in water, and measuring the period of time required to cut off the paper. The results are given in FIGS. 1 and 2.

EXAMPLE 3

Resin No. 3 was mixed with a solution of cationic starch, carboxymethyl cellulose, polyvinylalcohol or anionic polyacrylamide and adjusted to pH 8.0 and 4.0% solids except for the mixture with carboxymethyl cellulose (2.0% solids). With the resulting mixed solution, the same base paper as used in Example 2 was coated by means of a roll coater. The resulting coated paper was air dried at room temperature (20°-30° C.) and then evaluated for IGT-pick resistance and wet rub resistance in the same manner as described in Example 2. Results are given in Table 2.

Table 2

| Composition of Coating Solution | | Coating Weight (g/m²) | IGT-pick Resistance (cm/sec.) | Wet Rub Resistance (min.) |
|---|---|---|---|---|
| Resin No. 3 (%) | Other Polymer (%) | | | |
| | Base Paper | 0 | 9.0 | 0.9 |
| 0 | Cationic Starch | 4.0 | 0.30 | 30.2 | 0.9 |
| 0.5 | Cationic Starch | 3.5 | 0.30 | 65.3 | 4.1 |
| 1.0 | Cationic Starch | 3.0 | 0.29 | 81.6 | 8.5 |
| 0 | Carboxymethyl cellulose | 2.0 | 0.21 | 31.5 | 1.6 |
| 0.2 | Carboxymethyl cellulose | 1.8 | 0.20 | 52.7 | 5.3 |
| 0.5 | Carboxymethyl cellulose | 1.5 | 0.20 | 73.6 | 9.7 |
| 0 | Polyvinylalcohol | 4.0 | 0.24 | 60.1 | 1.3 |
| 0.5 | Polyvinylalcohol | 3.5 | 0.24 | 82.6 | 4.2 |
| 1.0 | Polyvinyl alcohol | 3.0 | 0.23 | 93.7 | 8.5 |
| 0 | Anionic Polyacrylamide | 4.0 | 0.43 | 59.7 | 2.1 |
| 0.5 | Anionic Polyacrylamide | 3.5 | 0.41 | 80.3 | 8.0 |
| 1.0 | Anionic Polyacrylamide | 3.0 | 0.40 | 93.7 | 19.3 |

EXAMPLE 4

An aqueous slurry of oxidized starch was cooked together with Resin No. 5 at about 100° C. for one hour. After cooling, the resulting solution was mixed with kaolin clay, calcium carbonate and trace amounts of sodium hexamethaphosphate as a dispersing agent to form a slurry having a 45 to 50% solids consistency. With the resulting slurry, a commercially available base stock for coating paper was coated by means of a bar coater. The resulting coated paper was air dried at room temperature (20°-30° C.) and then evaluated for IGT-pick resistance in the same manner as described in Example 2 except for printing with IPI ink No. 4 and wet rub resistance. The wet rub test consisted of rubbing the coated paper surface with a rubber roll rotating at 30 rpm for 30 seconds, the bottom end of which was soaked in water, and measuring the 460 nm transmittance of the resulting dispersion on a spectrophotometer. Results are given in Table 3.

Table 3

| Composition (parts) | | | | Total Solids (%) | pH | Viscosity (cps)[a] | Coating Weight (g/m²) | IGT-pick Resistance (cm/sec.) | Wet Rub Resistance (% transmittance) |
|---|---|---|---|---|---|---|---|---|---|
| Resin No. 5 | Oxidized Starch | Kaolin Clay | Calcium Carbonate | | | | | | |
| 0 | 20 | 100 | 0 | 50 | 6.7 | 1,360 | 13.0 | 50 | 67.0 |
| 0.5 | 20 | 100 | 0 | 50 | 6.6 | 1,360 | 12.8 | 100 | 86.5 |
| 1.0 | 20 | 100 | 0 | 50 | 6.6 | 1,350 | 13.2 | 135 | 90.8 |
| 2.0 | 20 | 100 | 0 | 50 | 6.5 | 1,370 | 13.1 | 150 | 92.5 |
| PX[b] 2.0 | 20 | 100 | 0 | 50 | 6.7 | 4,050 | 13.3 | 55 | 69.1 |
| 0 | 20 | 50 | 50 | 45 | 8.8 | 1,100 | 13.2 | 45 | 70.6 |
| 0.5 | 20 | 50 | 50 | 45 | 8.7 | 1,100 | 13.0 | 105 | 89.1 |
| 1.0 | 20 | 50 | 50 | 45 | 8.7 | 1,100 | 13.3 | 130 | 91.8 |
| 2.0 | 20 | 50 | 50 | 45 | 8.7 | 1,150 | 12.9 | 160 | 96.0 |
| PX[b] 2.0 | 20 | 50 | 50 | 45 | 8.6 | 2,350 | 12.9 | 50 | 71.2 |

[a] measured with a Brookfield Viscometer at 60 rpm
[b] a commercially available polyamide-epichlorohydrin resin

What is claimed is:

1. A process for coating paper to impart both wet and dry strength which comprises coating paper with an aqueous solution having a pH of 3 to 10 of a water-soluble thermosetting resin of the formula

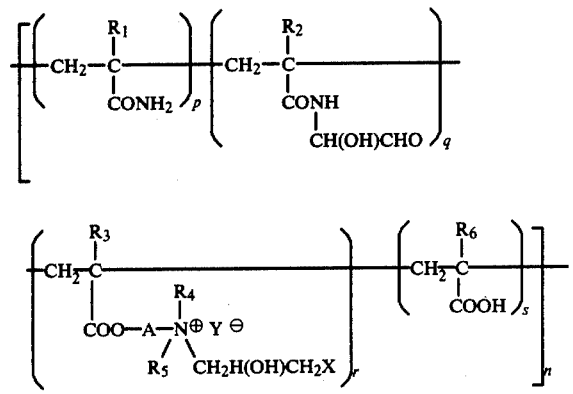

wherein:
$R_1$, $R_2$, $R_3$ and $R_6$ are independently selected from the group consisting of hydrogen and a methyl group,
both $R_4$ and $R_5$ are alkyl groups having 1 to 3 carbon atoms,
A is an alkylene group having 2 to 6 carbon atoms,
X is selected from the group consisting of chlorine, bromine and iodine,
Y is an anion selected from the group consisting of nitrate ion, chloride ion, sulfate ion and phosphate ion,
p, q, r and s are molar ratios of the recurring units arranged linearly and are the whole numbers having the relation of $q/(p+q)=0.1-1.0$, $r/(p+q+r+s)=0.001-0.1$ and $s/r=0-2.0$, and
n is a number of about 100 to 1000.

2. The process of claim 1 wherein the resin is mixed with one or more other types of water-soluble polymers selected from the group consisting of starch, oxidized starch, cationic starch, carboxymethyl cellulose, polyvinylalcohol and polyacrylamide.

3. The process of claim 2 wherein the mixed solution of the resin and the other water-soluble polymer is mixed with one or more different types of pigments selected from the group consisting of clay, calcium carbonate and titanium dioxide.

4. The process of claim 1, 2 or 3 wherein the resin used is one in which $R_1$, $R_2$ and $R_6$ are each hydrogen, and $R_3$, $R_4$ and $R_5$ are each a methyl group, and X is chlorine.

5. The process of claim 1, 2 or 3 wherein the resin used is one in which both $R_1$ and $R_2$ are each hydrogen, and $R_3$, $R_4$, $R_5$ and $R_6$ are each a methyl group and X is chlorine.

6. The process of claim 4 wherein the resin used is one in which Y is a nitrate ion.

7. The process of claim 5 wherein the resin used is one in which Y is a nitrate ion.

8. The process of claim 4 wherein the resin used is one in which Y is a chloride ion.

9. The process of claim 5 wherein the resin used is one in which Y is a chloride ion.